(12) United States Patent
Ohama et al.

(10) Patent No.: US 9,067,748 B2
(45) Date of Patent: Jun. 30, 2015

(54) DOCUMENT FEEDER

(71) Applicants: Takashi Ohama, Iwakura (JP);
Yoshinori Osakabe, Seto (JP);
Toshitaka Iwago, Okazaki (JP)

(72) Inventors: Takashi Ohama, Iwakura (JP);
Yoshinori Osakabe, Seto (JP);
Toshitaka Iwago, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 14/082,710

(22) Filed: Nov. 18, 2013

(65) Prior Publication Data

US 2014/0070477 A1    Mar. 13, 2014

Related U.S. Application Data

(62) Division of application No. 12/382,458, filed on Mar. 17, 2009, now Pat. No. 8,585,035, which is a division of application No. 11/073,873, filed on Mar. 8, 2005, now Pat. No. 7,793,928.

(30) Foreign Application Priority Data

Mar. 8, 2004  (JP) ................................. 2004-064657

(51) Int. Cl.
*B65H 29/12* (2006.01)
*B65H 5/06* (2006.01)
(Continued)

(52) U.S. Cl.
CPC ................ *B65H 5/26* (2013.01); *B65H 29/125* (2013.01); *B65H 15/00* (2013.01); *B65H 5/062* (2013.01); *H04N 1/00602* (2013.01); *H04N 1/04* (2013.01); *B65H 7/00* (2013.01)

(58) Field of Classification Search
CPC ..... H04N 1/04; H04N 1/00602; B65H 29/125; B65H 5/062
USPC ................ 271/273, 272, 274, 4.01, 4.08, 4.1, 271/10.01, 10.09, 10.11
See application file for complete search history.

(56) References Cited

U.S. PATENT DOCUMENTS 4,739,376 A    4/1988  Kanekol
4,822,021 A    4/1989  Giannetti et al.
(Continued)

FOREIGN PATENT DOCUMENTS

JP    U-56-72849    6/1981
JP    U-57-93940    6/1982
(Continued)

OTHER PUBLICATIONS

Dec. 24, 2009 Office Action issued in U.S. Appl. No. 11/073,873.
(Continued)

*Primary Examiner* — Luis A Gonzalez
(74) *Attorney, Agent, or Firm* — Oliff PLC

(57) ABSTRACT

A document feeder includes a reverse transporting mechanism that forms a substantially U-shaped document transporting pathway for carrying a document from a feeding tray located at a lower side to a discharging tray located at an upper side through a reading position, a pulling device, a separating-transporting device and a openable pathway cover. The pulling device and the separating-transporting device are arranged at substantially the same horizontal level within the height that is occupied by the reverse transporting mechanism. The pathway cover is capable of opening and closing to cover on the pulling device, the separating-transporting device and the reverse transporting mechanism.

8 Claims, 14 Drawing Sheets

(51) Int. Cl.
 *B65H 5/26* (2006.01)
 *B65H 15/00* (2006.01)
 *H04N 1/00* (2006.01)
 *H04N 1/04* (2006.01)
 *B65H 7/00* (2006.01)

(56) References Cited

U.S. PATENT DOCUMENTS

| | | |
|---|---|---|
| 4,851,885 A | 7/1989 | Kurosaki |
| 4,884,097 A | 11/1989 | Giannetti et al. |
| 5,199,700 A | 4/1993 | Fairey et al. |
| 5,731,885 A | 3/1998 | Nagahara |
| 5,825,513 A | 10/1998 | Hasegawa |
| 6,047,959 A | 4/2000 | Baba et al. |
| 6,076,822 A | 6/2000 | Baba et al. |
| 6,206,368 B1 | 3/2001 | Kobayashi et al. |
| 6,241,237 B1 | 6/2001 | Bokelman |
| 6,618,575 B2 | 9/2003 | Takida et al. |
| 6,648,320 B2 | 11/2003 | Iino et al. |
| 6,788,440 B1 | 9/2004 | Sashida |
| 7,099,618 B2 | 8/2006 | Iwago et al. |
| 7,212,321 B2 | 5/2007 | Sugiyama et al. |
| 7,251,063 B2 | 7/2007 | Mui et al. |
| 7,379,700 B2 | 5/2008 | Iwata |
| 2001/0017438 A1 | 8/2001 | Takamtsu |
| 2004/0062579 A1 | 4/2004 | Iwago et al. |
| 2005/0058477 A1 | 3/2005 | Aoki et al. |

FOREIGN PATENT DOCUMENTS

| | | |
|---|---|---|
| JP | A-60-204547 | 10/1985 |
| JP | A-61-148955 | 7/1986 |
| JP | A-63-247258 | 10/1988 |
| JP | A-64-70759 | 3/1989 |
| JP | U-1-99830 | 7/1989 |
| JP | A-2-502715 | 8/1990 |
| JP | A-4-159957 | 6/1992 |
| JP | A-5-77962 | 3/1993 |
| JP | A-6-343123 | 12/1994 |
| JP | A-2006-343123 | 12/1994 |
| JP | A-9-240851 | 9/1997 |
| JP | A-10-167513 | 6/1998 |
| JP | A-10-171181 | 6/1998 |
| JP | A-2000-289865 | 10/2000 |
| JP | A-2001-130782 | 5/2001 |
| JP | A-2001-151370 | 6/2001 |
| JP | A-2001-233491 | 8/2001 |
| JP | A-2001-354328 | 12/2001 |
| JP | A-2002-162799 | 6/2002 |
| JP | A-2002-193472 | 7/2002 |
| JP | A-2002-335372 | 11/2002 |
| JP | A-2002-344695 | 11/2002 |
| JP | A-2002-368953 | 12/2002 |
| JP | A-2003-69788 | 3/2003 |
| JP | A-2003-076074 | 3/2003 |
| JP | A-2003-128288 | 5/2003 |
| JP | A-2003-298811 | 10/2003 |

OTHER PUBLICATIONS

English translation of Jan. 17, 2012 Appeal Decision in Japanese Patent Application No. 2007-185322.

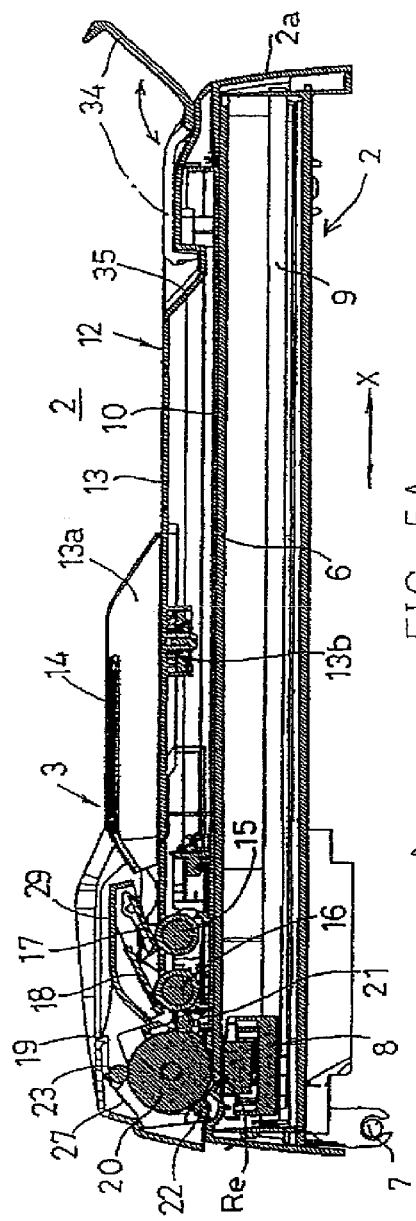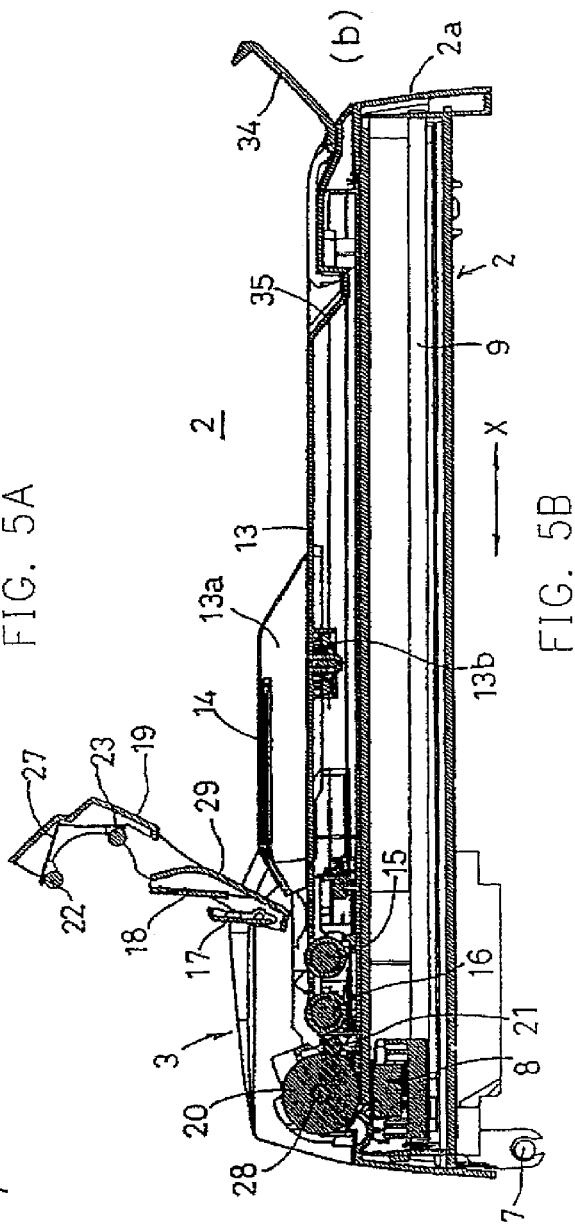
FIG. 5A
FIG. 5B

DOCUMENT FEEDER

CROSS-REFERENCE TO RELATED APPLICATION

This is a Divisional Application of application Ser. No. 12/382,468, filed Mar. 17, 2009, which is a Divisional Application of application Ser. No. 11/073,873 filed Mar. 8, 2005, which claims priority from Japanese Patent Application No. 2004-064657, filed on Mar. 8, 2004, the subject matter of which are incorporated herein in their entirety by reference thereto.

BACKGROUND OF THE INVENTION

1. Field of the Invention

The present invention relates to a document feeder provided to an image reader having a reading device that reads an image, at a reading position, from a document that is being conveyed. The present invention particularly relates to a thin document feeder having a substantially U-shaped document transporting pathway for conveying the document from a sheet feeding portion to a sheet discharging portion through the reading position.

2. Description of the Related Art

There is an imaging reader that is capable of reading an image recording surface of a stationary document and a moving document. Such the image reader is generally provided with two kinds of transparent plates (glass plates) for reading a stationary document and a moving document, on a body of the image reader. To read a stationary document, a document is placed on one of the transparent plates (flatbed type) and is pressed by a cover capable of opening and closing with respect to the body of the image reader. The document is then read by an image scanner (an image reading device) moving along an underside of the transparent plate (flatbed type). In the case of reading a moving document, a plurality of documents stacking on a feeding tray is separated one by one by an automatic document feeder (ADF) disposed on the cover, and is conveyed to the transparent plate. After the image recording surface is read by the image reading device halting under the transparent plate, the document is discharged to a discharging tray.

The document transporting pathway may be generally provided in automatic document feeders. One type of the ADFs may be an upper feeding type, for example, disclosed in Japanese Patent Laid-Open Patent Publication No. 2003-76074 (FIG. 1). This type of the ADF has a substantially U-shaped document transporting pathway that extends from a sheet feeding portion located at the upper side to a discharging portion located at the lower side, through a document reading position. Another type of the ADFs may be a lower feeding type, for example, disclosed in Japanese Laid-Open Patent Publication No. 2002-335372 (FIG. 1). This type of the ADF has a substantially U-shaped document transporting pathway that extents from a sheet feeding portion located at the lower side to a discharging portion located at the upper side, through a document reading position.

In the ADF disclosed in JP2003-76074, a pickup roller, a separating roller and first and second pairs of transporting rollers are disposed at positions upstream from the document reading position (the upper side of the body of the ADF) with respect to the document conveying direction in the substantially U-shaped document transporting pathway. A pair of discharging rollers is disposed at a position downstream from the document reading position with respect to the document conveying direction. A document stacking tray is tilted downward facing the pickup rollers and is disposed at a position upstream from the pickup roller with respect to the document conveying direction. A document discharging tray is arranged under the document stacking tray. In the ADF disclosed in JP2002-335372, a document feeding tray is disposed above and in parallel with a transparent plate for a stationary document. A pickup roller and a separating pad are disposed at a position downstream from the document feeding tray with respect to the document conveying direction. A pair of transporting rollers is disposed at a position downstream from the separating pad with respect to the document conveying direction. Contact rollers are disposed at the front and back of a reading position where a document that is being conveyed is read, in the document conveying direction. A substantially sideways U-shaped transporting pathway is provided at a position downstream from the contact rollers in order to turn a document so that a recording surface of the document faces up. A pair of discharging rollers is provided at a downstream position of the substantially U-shaped transporting pathway (at a discharging side) with respect to the document conveying direction.

SUMMARY OF THE INVENTION

According to the ADF disclosed in JP2003-76074, because the document discharging tray is disposed under the document stacking tray, a space that is large enough to place a hand of an operator therein is present between the document discharging tray and the document stacking tray. The position of the document stacking tray is thereby higher. Accordingly the ADF becomes oversized.

According to the ADF disclosed in JP2002-335372, because the pickup roller, the pair of transporting rollers and the pair of discharging rollers are disposed at the positions that are higher than the pair of the contact rollers. The structure of the ADF becomes complicated when driving systems of the above members are also taken into consideration. An oversized ADF is again resulted.

The present invention provides a thin document feeder with a simple and compact structure, wherein a substantially U-shaped document transporting pathway is provided and a document discharging portion is provided at a position that is higher than a position where a document feeding portion is provided.

According to one aspect of the invention, a document feeder provided on an image reader having a reading device that reads an image of a document of a plurality of documents at a reading position is provided, wherein the document is being conveyed in a predetermined conveying direction. The document feeder includes a substantially U-shaped document transporting pathway, through which the document can pass from a feeding tray to a discharging tray, which is provided above the feeding tray, via the reading position. The substantially U-shaped document transporting pathway includes a first path, in which the document is conveyed in a first transportation direction; and a second path, in which the document is conveyed in a second transportation direction that is opposite to the first transportation direction. The document feeder further includes a reverse transporting mechanism that is disposed adjacent to the substantially U-shaped document transporting pathway and conveys the document in the substantially U-shaped document transporting pathway; a pulling device that draws the plurality of the documents stacked on the feeding tray; a separating-transporting device that separates one of the plurality of the documents drawn by the pulling device and conveys the separated document to the reverse transporting mechanism; and an openable pathway cover that covers the pulling device, the separating-transporting device and the reverse transporting mechanism when the pathway cover is closed. The pulling device and the separating-transporting device are aligned in the first transportation direction and are disposed within a range that is occupied by a height of the reverse transporting mechanism.

With this structure, the positions where the pulling device and the separating-transporting device are provided are lower than the highest point of the reverse transporting mechanism. Accordingly, the document feeder can be prevented from becoming large in height.

According to one aspect of the invention, a sheet feeder that separates a sheet from a stack of sheets and conveys the separated sheet is provided. The sheet feeder includes a substantially U-shaped sheet transporting pathway, through which a sheet can pass; a reverse roller that conveys the sheet in the substantially U-shaped sheet transporting pathway; a pulling roller that draws the stack of sheets toward the reverse roller; and a separating roller that separates the sheet from the stack of sheets and conveys the separated sheet toward the reverse roller, wherein the pulling roller and the separating roller are disposed within a range that is occupied by a height of the reverse roller.

With this structure, the positions where the pulling roller and the separating roller are provided are lower than the highest point of the reverse roller. Accordingly, the sheet feeder can be prevented from becoming large in height.

BRIEF DESCRIPTION OF THE DRAWINGS

FIG. 5A is a cross-sectional view along line Va-Va of FIG. 2.

FIG. 5B is a cross-sectional view along line Vb-Vb of FIG. 4.

DETAILED DESCRIPTION OF EMBODIMENTS

Figure 1:
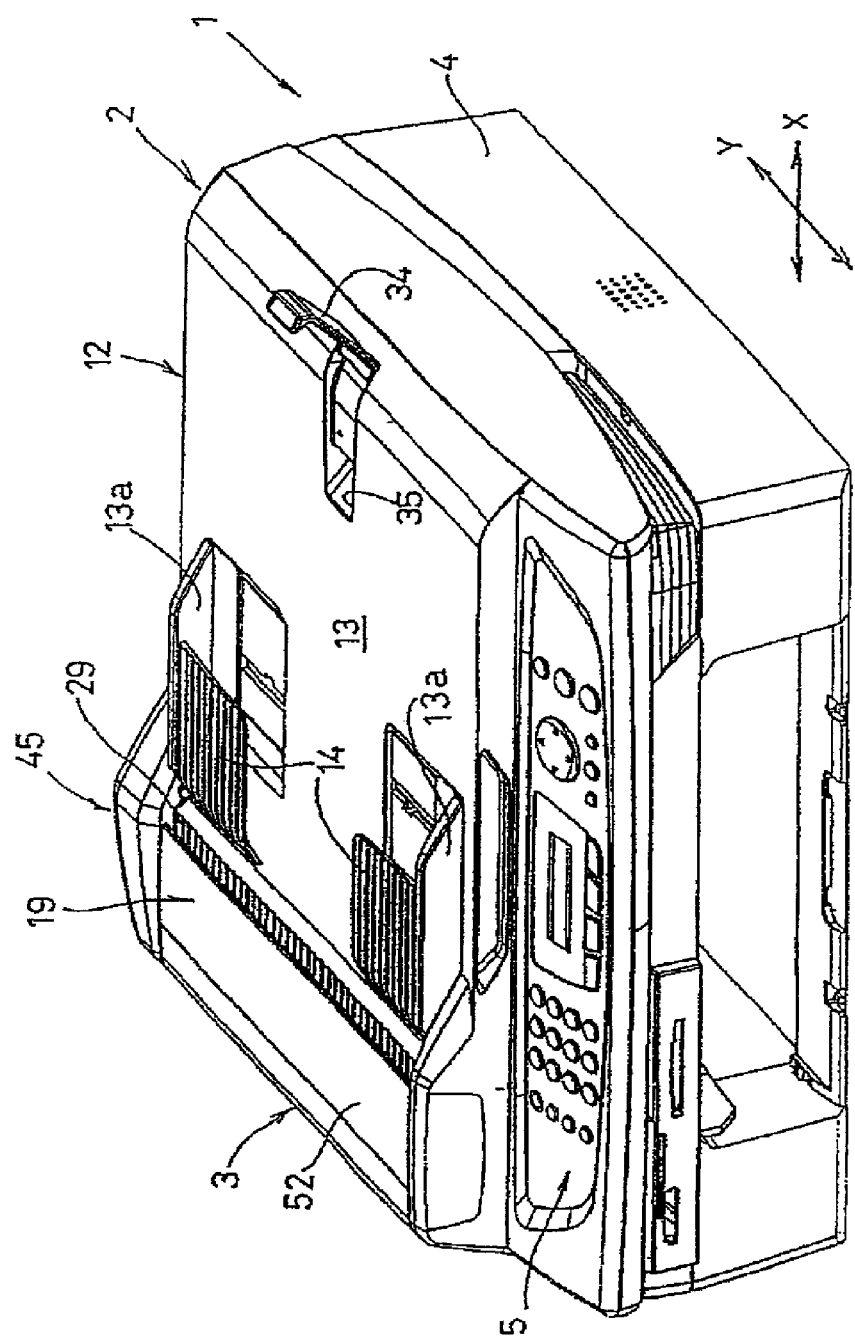
FIG. 1 is a perspective view of a multi-function apparatus with a document feeder of an exemplary embodiment the present invention.

Exemplary embodiments for practicing the present invention will be explained with referring to the drawings.

The embodiments of the present invention are applied to an image reader 2 and a document feeder 3 that are provided in a multi-function apparatus 1 having the functions of faxing, scanning, copying and printing. Throughout the specification, the near side in FIG. 1 is referred to as the front of the multi-function apparatus 1. The far side, which is opposite to the near side, in FIG. 1 is referred to as the rear or back of the multi-function apparatus 1. The right side in FIG. 1 is referred to as the right side of the multi-function apparatus 1. The left side in FIG. 1 is referred to as the left side of the multi-function apparatus 1.

Figure 2:
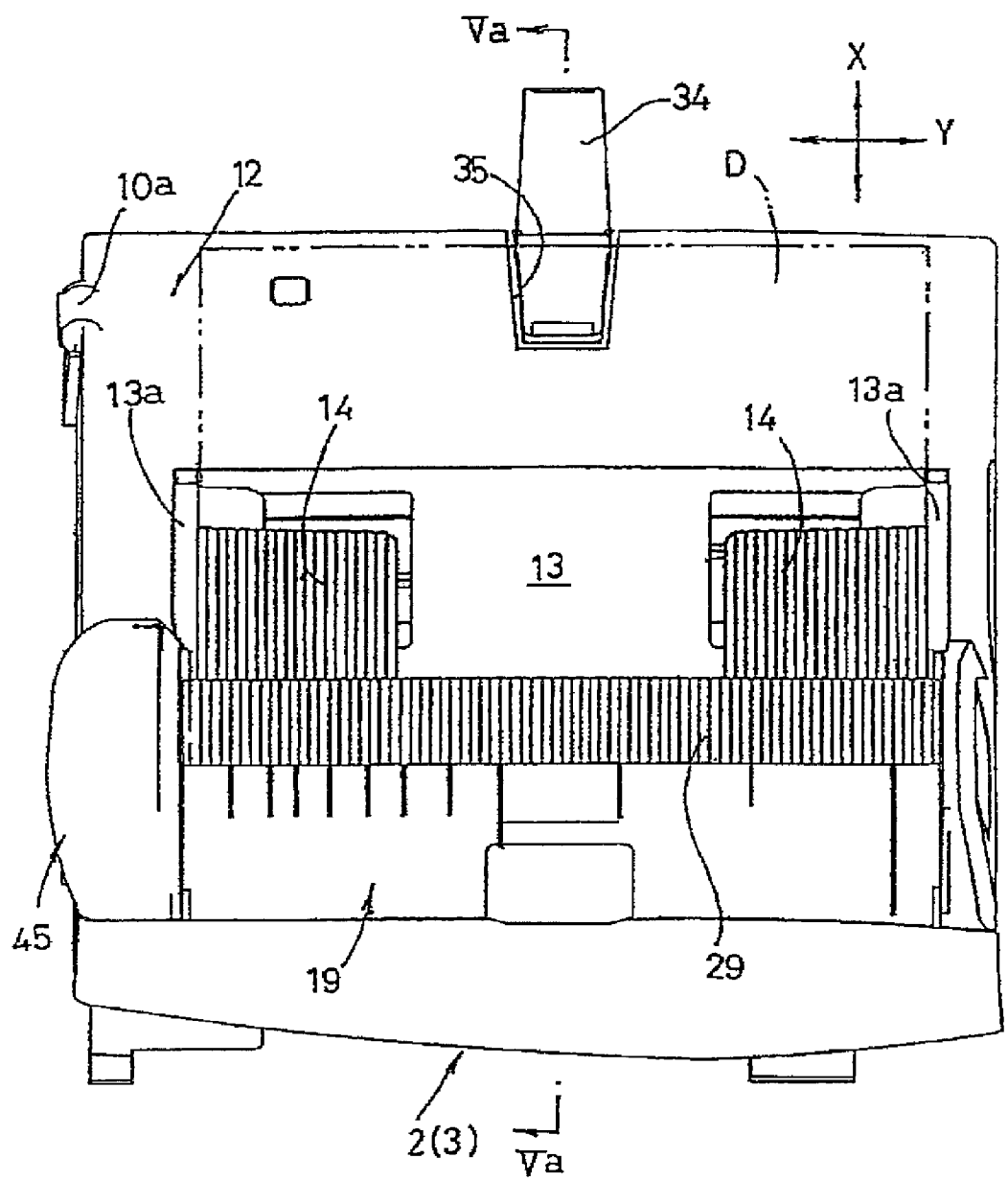
FIG. 2 is a plan view of the multi-function apparatus of FIG. 1.
Figure 3:
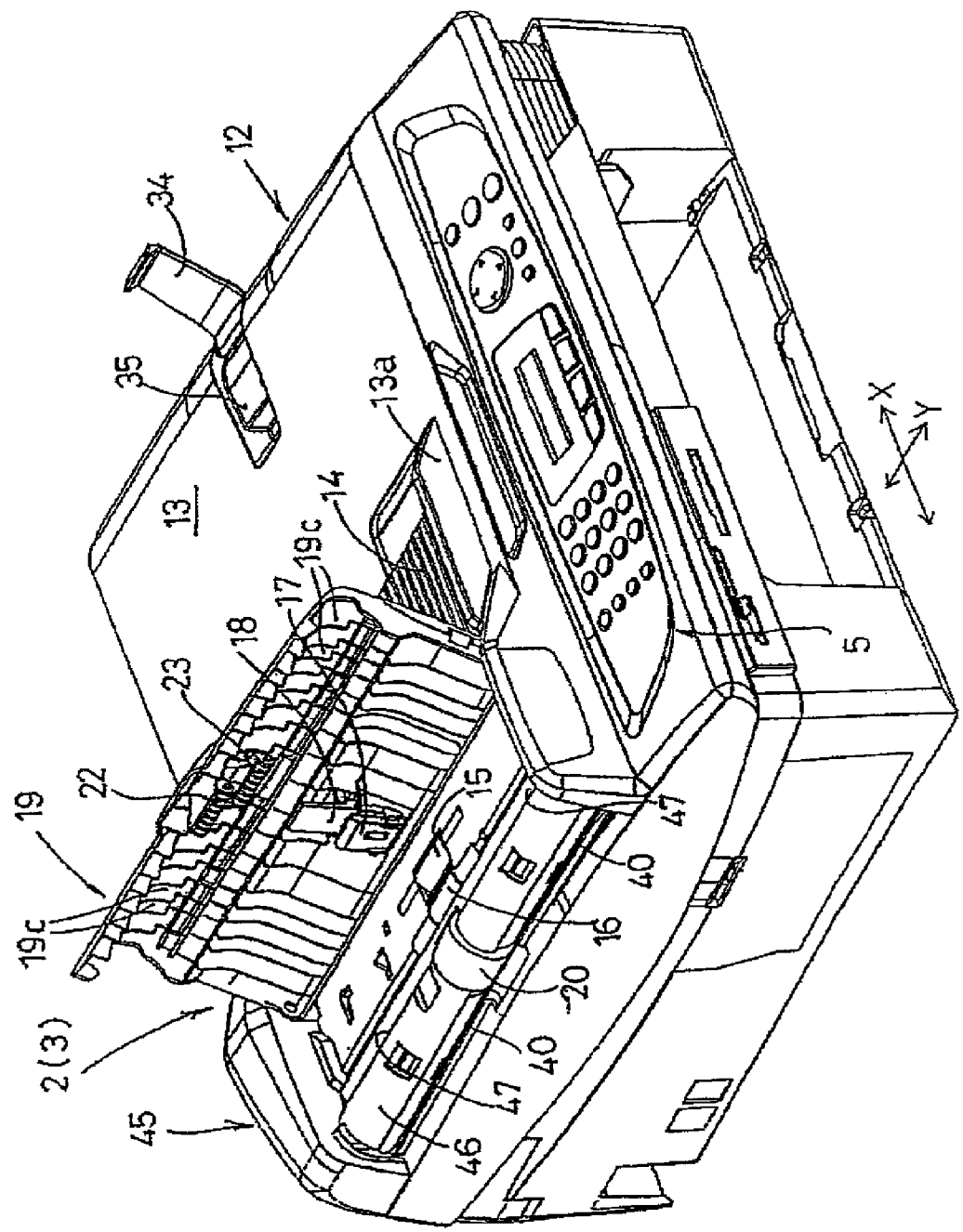
FIG. 3 is a perspective view of the multi-function apparatus when the pathway cover of the document feeder is opened.

As shown in FIGS. 1 and 2, an operation panel 5 having a ten key for executing the faxing, scanning, copying or printing function, buttons and keys for commanding various operations, and an LCD panel for displaying, for example, command contents or error messages, is arranged on an upper surface of a body case 4 of the multi-function apparatus 1. The image reader 2 for implementing the scanning function and the document feeder 3 are disposed at the back of the operation panel 5. As shown in FIGS. 5A and 5B, a glass plate 6 is arranged on a case 2a of the image reader 2 for serving as a transparent plate for a stationary document and for a moving document. The glass plate 6 serves as a first transparent member and a second transparent member. A linear-shaped reading device 8, for example, a contact image sensor (CIS) for reading an image recording surface of a document is disposed under the glass plate 6. The linear-shaped reading device 8 is mounted on a guiding shaft 9. The guiding shaft 9 having a linear-shape extends in an X direction in FIG. 1 such that the reading device 8 is capable of reciprocating thereon. The reading device 8 has a rectangular body and is disposed such that its longer sides extend in a Y direction in FIG. 1.

The case 2a of the image reader 2 is capable of pivoting upward and downward about a pivot 7 (referring to FIGS. 5A and 5B) that is horizontally arranged on the body case 4 at one side of the case 2a (the left side of FIGS. 1 and 2 in the embodiments).

Figure 4:
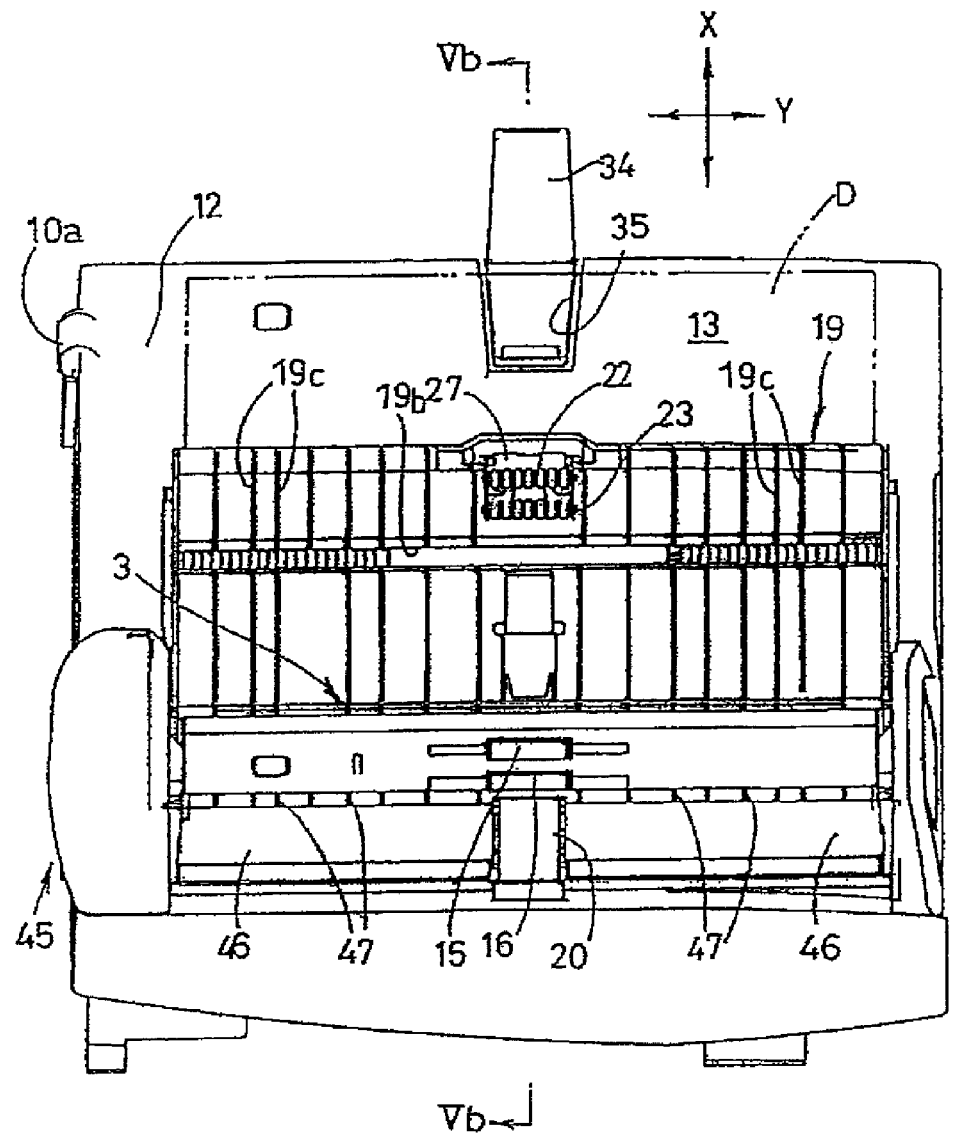
FIG. 4 is a plan view of the multi-function apparatus when the pathway cover of the document feeder is opened.

The document feeder (automatic document feeder, ADF) 3 for conveying a document to the image reader 2 is disposed above a pressing plate 10 (which functions as the second pressing member). The pressing plate 10 contacts an image recording surface of the document with the glass plate 6 and presses the stationary document. The synthetic resin pressing plate 10 is pivotable upward and downward with respect to the case 2a about a hinge 10a (only one hinge is shown in FIGS. 2 and 4) located at a rear end of the pressing plate 10 (i.e. at the side oppose to the operation panel 5). A pressing body (not shown) including a sponge or a white plate etc. may also be attached to the lower surface of the pressing plate 10.

As shown in FIGS. 5A, 5B, 6 and 7, in the left part of the glass plate 6 where the reading device 8 is positioned, a document exposing portion is provided. The document exposing portion has an opening 36 for exposing a portion of the down-facing image recording surface of the document D to be conveyed in a first transportation direction (described latter) is provided at the left of a guiding plate 11 attached on the glass plate 6. The guiding plate 11 extends in the Y direction. A position above a detection position of the CIS also refers to a reading position Re at which a document that is being conveyed is read. The right part of the glass plate 6 with respect to the guiding plate 11, which extends in the Y direction and is attached to the glass plate 6, refers to a reading area of the stationary document. The reading device 8 serves as first and second reading devices.

The document feeder 3 according to a first embodiment of the present invention is disposed adjacent to a feeding tray 13 and a discharging tray 14, as shown in FIGS. 1 to 7. The feeding tray 13 is formed on an upper cover 12 covering substantially the entire body of the pressing plate 10. The discharging tray 14 is disposed at a position that is higher than the feeding tray 13. The discharging tray 14 is shorter than the feeding tray 13 in the X direction. The document feeder 3 has a substantially U-shape document transporting pathway that includes a first path, in which a document D is conveyed in a first direction, and a second path, in which the document D is conveyed in a second direction. The first direction is referred to a direction which the document D is conveyed from the feeding tray 14 to the reading position Re (FIGS. 5A and 6) located at one side of the feeding tray 13 (i.e. one side in the X direction), and the second direction is referred to a direction which the document D is conveyed from the reading position Re to the discharging tray 14. The discharging tray 14 is integrally formed on upper surfaces of a pair of document guides 13a protruding upward from the upper side of the upper cover 12. Through an interlock mechanism 13b (FIGS. 5A, 5B), once one of the document guides 13a is moved manually, the pair of document guides 13a move in the Y direction simultaneously to allow an adjustment of the width therebetween according to the width of the document D in the Y direction. As described above since the length of the discharging tray 14 in the X direction is shorter than that of the feeding tray 13, the portion close to the other side of the feeding tray 13 (the opposite side that is furthest away from the document transporting pathway) serves as a supporting unit for supporting the discharged documents D that have been read in a stack. Because an upstream portion of the feeding tray 13 with respect to the document conveying direction serves as the supporting unit for supporting the discharged documents D that have been read in a stack, the height of where the documents D are stacked can be reduced. Thus, the multi-function apparatus 1 can become more compact. In order to prevent the front end of the discharged document D from slipping downward from an upstream end portion of the feeding tray 13, a document stopper 34 is provided at the upstream end of the upper cover 12 (the feeding tray 13). A recess 35 that is opened at the top and with which the document stopper 34 is engaged is provided at the upstream end portion of the upper cover 12. The document stopper 34 can be pivoted at its base end in the upstream and downstream directions. The document stopper 34 can be stored in the recess 35. With this structure, the document stopper 34 does not extend beyond the top of the feeding tray 13 (the body case 4) when the multi-function apparatus 1 is not in use or is being packaged. Thus, the multi-function apparatus 1 becomes compact.

The document feeder 3 includes a separating-transporting device, a reverse transporting mechanism and a pathway cover. The separating-transporting device includes a first rotation driving member that separates one sheet of the document from a plurality of documents stacked on the feeding tray 13 and then conveys the document in the first transportation direction (in the direction which the document that is conveyed approaches the reading position Re) and a first contacting member that is capable of resiliently contacting the first rotation driving member. At least one of the first contacting member and the first rotation driving member has an elastic property to provide a cushioning or resilient effect. The reverse transporting mechanism includes a second rotation driving member and a second contacting member. The second rotation driving member reverses the document conveyed from the first path (i.e. the document is conveyed in the first transportation direction) by the separating-transporting device at the reading position Re and further conveys the reversed document to the second path (i.e. the document is conveyed in the second transportation direction). The second contacting member is capable of resiliently contacting the second rotation driving member. At least one of the second contacting member and the second rotation driving member has an elastic property to provide a resilient effect to the other while contacting with each other. The pathway cover is disposed apart from the reverse transporting mechanism and is capable of rotating about a rotational shaft disposed at a position closer to the discharging tray 14 than the feeding tray 13. The pathway cover includes at least the second contacting member of the first and the second contacting members. The pathway cover defines at least a portion of the document transportation pathway. The pathway cover is capable of exposing at least the portion of the document transportation pathway by rotating about the rotational shaft.

Figure 12:
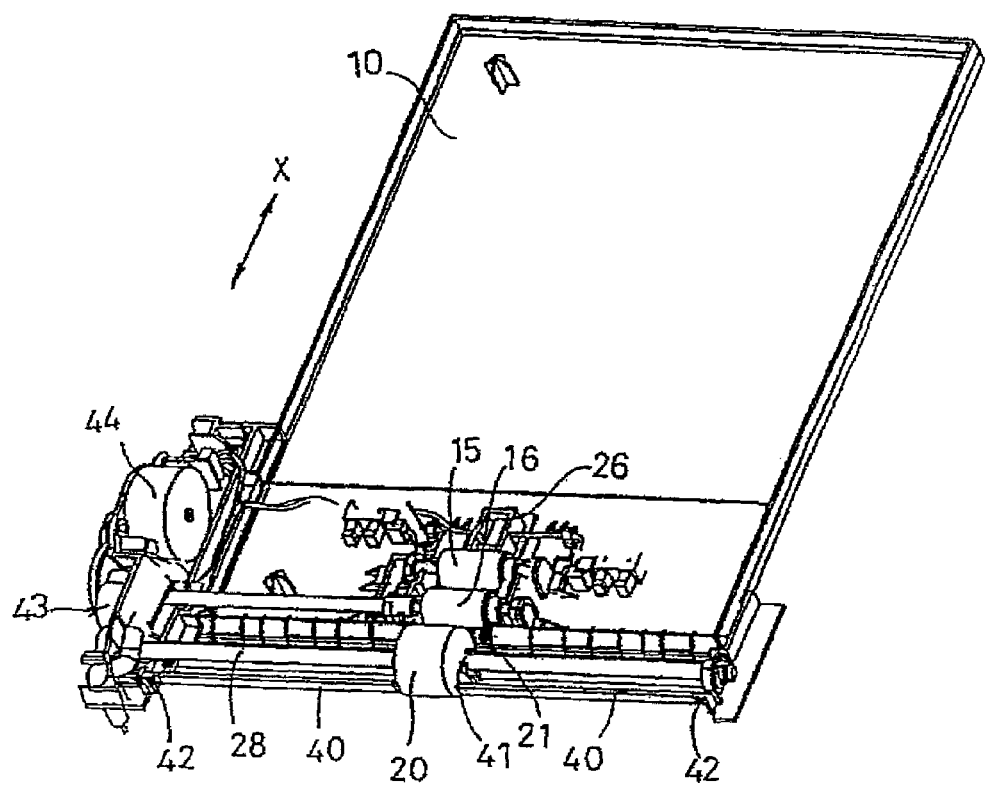
FIG. 12 is a perspective view of a first pressing member and the second pressing member.

In the first embodiment, as shown in FIGS. 5-7 and 9, two rotation driving rollers (a pulling roller 15 and a separating roller 16, which are provided in this order from the upstream side with respect to the document conveying direction) functioning as the first rotation driving member and a reverse roller 20 with a large diameter functioning as the second rotation driving member are arranged substantially at a central portion of a direction perpendicular to the document conveying direction (i.e. the direction along the width of the document D), above the pressing plate 10 (referring to FIG. 12). The reading position Re linearly extends in a direction perpendicular to the document conveying direction. A rotation axis of a driving shaft 28 that supports the reverse roller 20 coincides with the reading position Re in the plan view. Thus, the lower surface of the peripheral surface of the reverse roller 20 faces the reading surface of the reading device 8 when the reading device is located at the reading position Re.

Pad members (a pull-nipping plate 17 for the pulling roller 15 and a separating pad 18 for the separating roller 16) functioning as the first contacting member are capable of resiliently contacting the pulling roller 15 and the separating roller 16, respectively. In other words, at least one of the pull-nipping plate and the separating pad 18 and at least one of the pulling roller 15 and the separating roller 16 has an elastic property to provide a resilient effect to the other while contacting with each other. A second pinch roller 22 and a third pinch roller 23 are freely rotatable following rollers which function as a plurality of second contacting members that resiliently contact the reverse roller 20. The pull-nipping plate 17, the separating pad 18, the second pinch roller 22 and the third pinch roller 23 are disposed on the inner surface of the pathway cover 19. The pathway cover 19 has a substantially L-shape in cross section (referring to FIGS. 3 and 9). A cover-like upper guide member 52 to be subsequently described is not illustrated in FIGS. 5A, 5B-7, and 9. A pair of the pulling roller 15 and the pull-nipping plate 17 and a pair of the separating roller 16 and the separating pad 18 are aligned in the first direction and are disposed within a range that is occupied by a height of the third pinch roller 23 and the reverse roller 20. More specifically, the pulling roller 15 and the separating roller 16 are disposed within a range that is occupied by a height of the reverse roller 20. The pulling roller 15 and the separating roller 16 are disposed such that a support shaft of the pulling roller 15 and a support shaft of the separating roller 16 are located at a substantially same level.

The second pinch roller 22 and the third pinch roller 23 are supported by ends of a metal spring plate 27 having a substantially L-shaped cross section, via shafts of the second and third pinch rollers 22, 23. An intermediate portion of the spring plate 27 is fixed to the inner surface of the pathway cover 19. A first pinch roller 21 is a following roller that is disposed at a position downstream from the separating roller 16 with respect to the document conveying direction. The first pinch roller 21 is capable of contacting the reverse roller 20. The first pinch roller 21 is attached to a frame 24 made of, for example, metal. The frame 24 is disposed in a manner capable of moving in the X direction above the pressing plate 10. A compression coil spring 25 functioning as an urging device is provided to elastically press an upstream end of the frame 24 toward the reverse roller 20. An upstream end of the compression coil spring 25 is supported by a supporting plate 26 (referring to FIGS. 6 and 7)

A discharge assistant guiding plate 29 functioning as a discharging chute is provided to the pathway cover 19 and is disposed at a position downstream from the third pinch roller 23 with respect to the document conveying direction. An upstream end 29a of the discharge assistant guiding plate 29 is tilted so as to be positioned at a level that is lower than the top surface of the reverse roller 20. A space between the upstream end 29a of the discharge assistant guiding plate 29 and a downstream end 19b of an upper roof 19a of the pathway cover 19 serves as a discharging outlet of the document D. The discharge assistant guiding plate 29 has a horizontal portion 29b on the downstream side with respect to the document conveying direction. The horizontal portion 29b of the discharge assistant guiding plate 29 is disposed at a position which is the substantially same level as a position where a horizontal portion of the discharging tray 14 is provided, such that an upper surface of the horizontal portion 29b continues toward an upper surface of an upstream horizontal portion of the discharging tray 14. The pull-nipping plate 17 and the separating pad 18 are capable of rotating about their base ends (their upper ends), respectively, under the discharge assistant guiding plate 29, in the pathway cover 19. The pull-nipping plate 17 is pressed against the pulling roller 15 by a compression coil spring 30 functioning as a pressing member. The separating pad 18 is pressed against the upper surface of the separating roller 16 by a plate spring 31 functioning as a pressing member. Because the documents D stacked on the feeding tray 13 are pulled between the pull-nipping plate 17 and the pulling roller 15, a portion under the discharge assistant guiding plate 29 functions as a pull-in chute 32 into which the documents D are pulled from the feeding tray 13.

Figure 6:
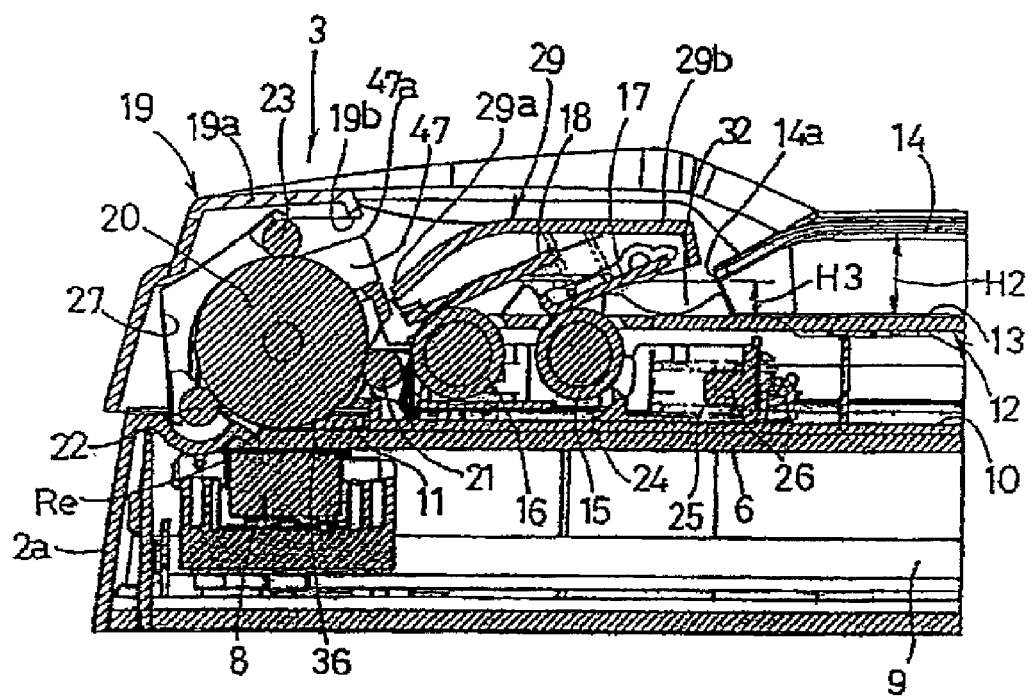
FIG. 6 is an enlarged cross-sectional view of the left side of FIG. 5A.
Figure 9:
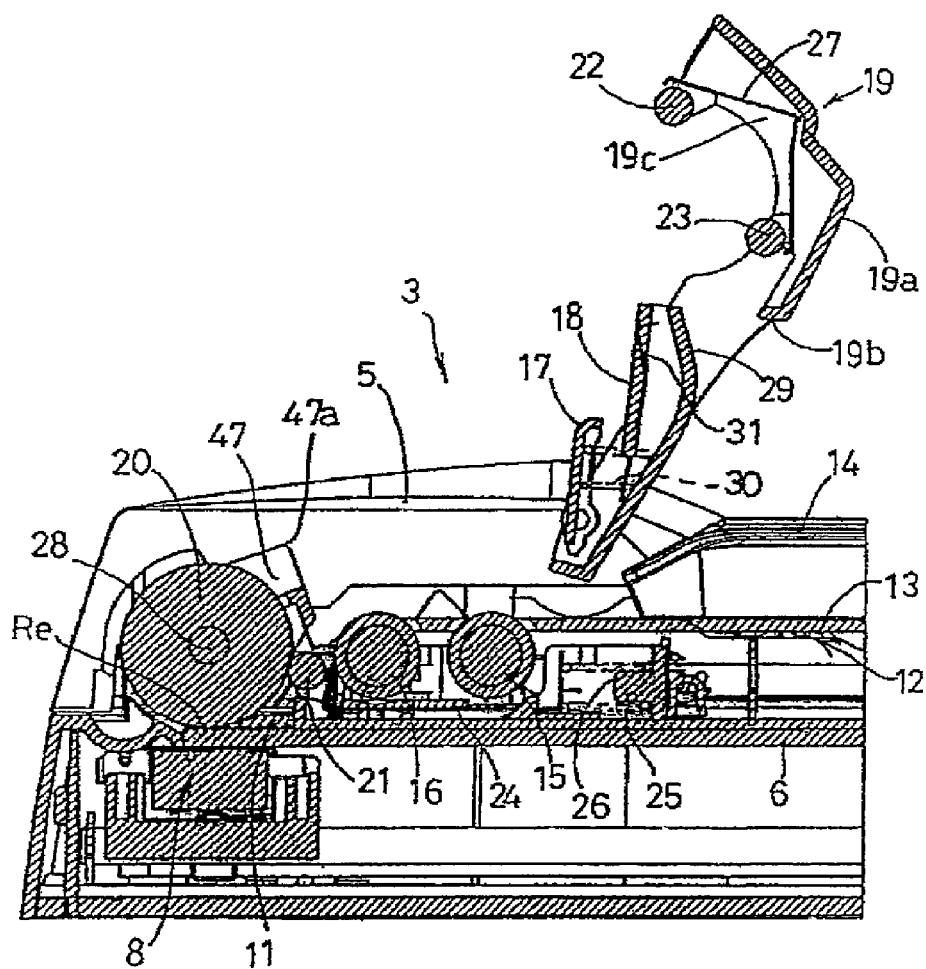
FIG. 9 is a cross-sectional view along line IX-IX of FIG. 8.
Figure 10:
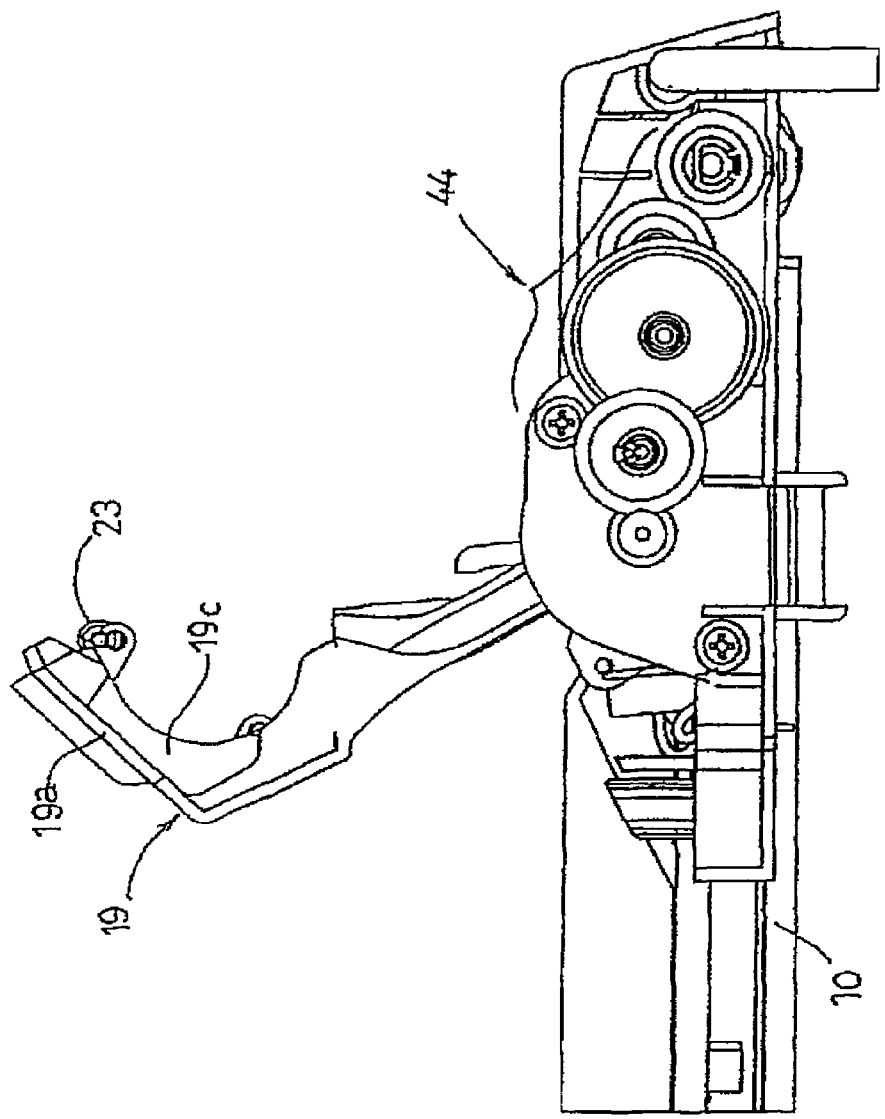
FIG. 10 is a side view of a power transmission part.
Figure 11:
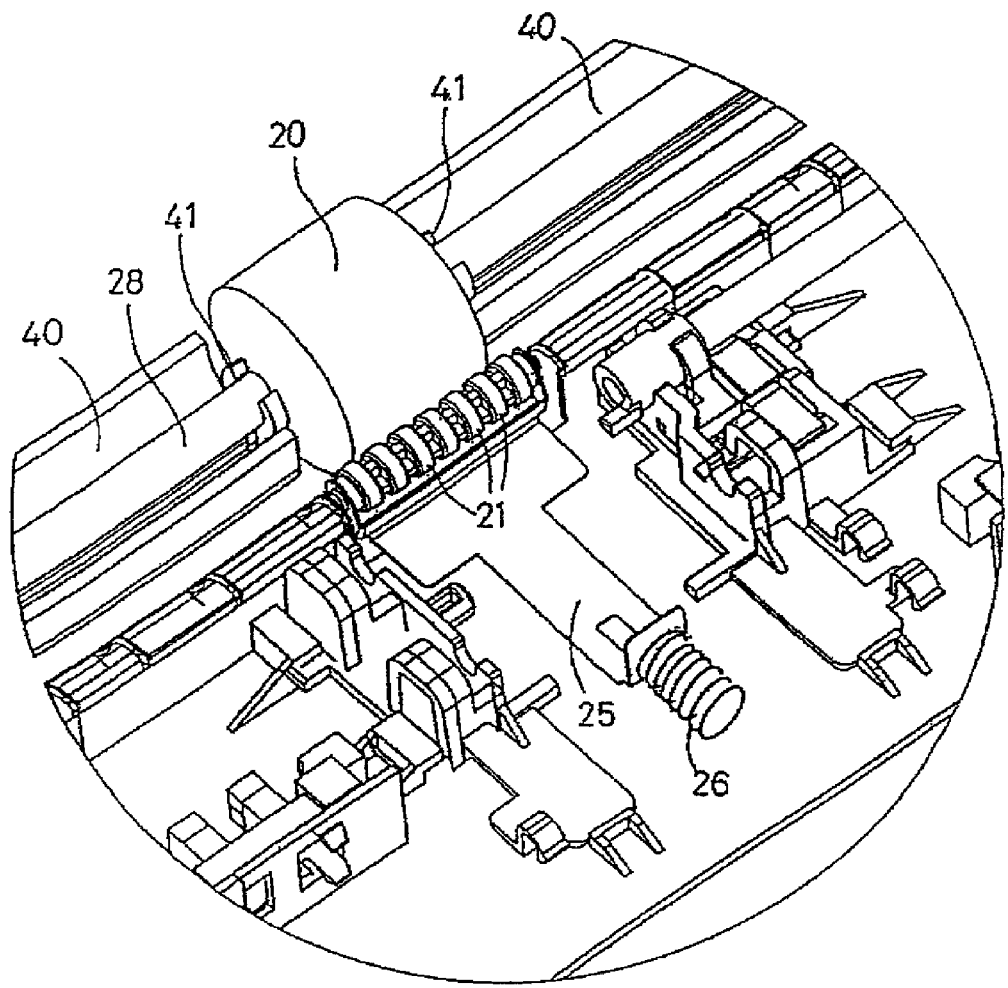
FIG. 11 is a perspective view of a pressing member of the first pinch roller.

The pathway cover 19 is capable of rotating upward and downward about a rotational shaft (not shown), which inwardly protrudes from both sides under the discharge assistant guiding plate 29 and near the base end of the pull-nipping plate 17 (i.e. at the position close to the separating-transporting device and far from the reverse roller 20). As shown in FIGS. 6 and 9, when the pathway cover 19 is closed, the pull-nipping plate 17, the separating pad 18 and the second and the third pinch rollers 22, 23 are resiliently pressed against the upper surfaces of the pulling roller 15, the upper surface of the separating roller 16 and the peripheral surface of the reverse side of the reverse roller 20, respectively. When the pathway cover 19 is rotated upward to be opened, the second pinch roller 22 and the third pinch roller 23 are separated from the reverse roller 20. If the pathway cover 19 is widely rotated substantially 120 degrees (referring to FIG. 9), the pull-nipping plate 17 and the separating pad 18 can separate from the pulling roller 15 and the separating roller, 16 respectively. Thus, if paper jam occurs, the document D sandwiched at the contacting portions (nipping portions) of these members can be easily removed. The paper jam problem can be solved. The document D sandwiched at the contacting portion (nipping portion) of the first pinch roller 21, which can move against the urging force of the coil spring 25, and the reverse roller 20 can be pulled out therefrom regardless of the extent of the urging force of the coil spring 25.

Figure 7:
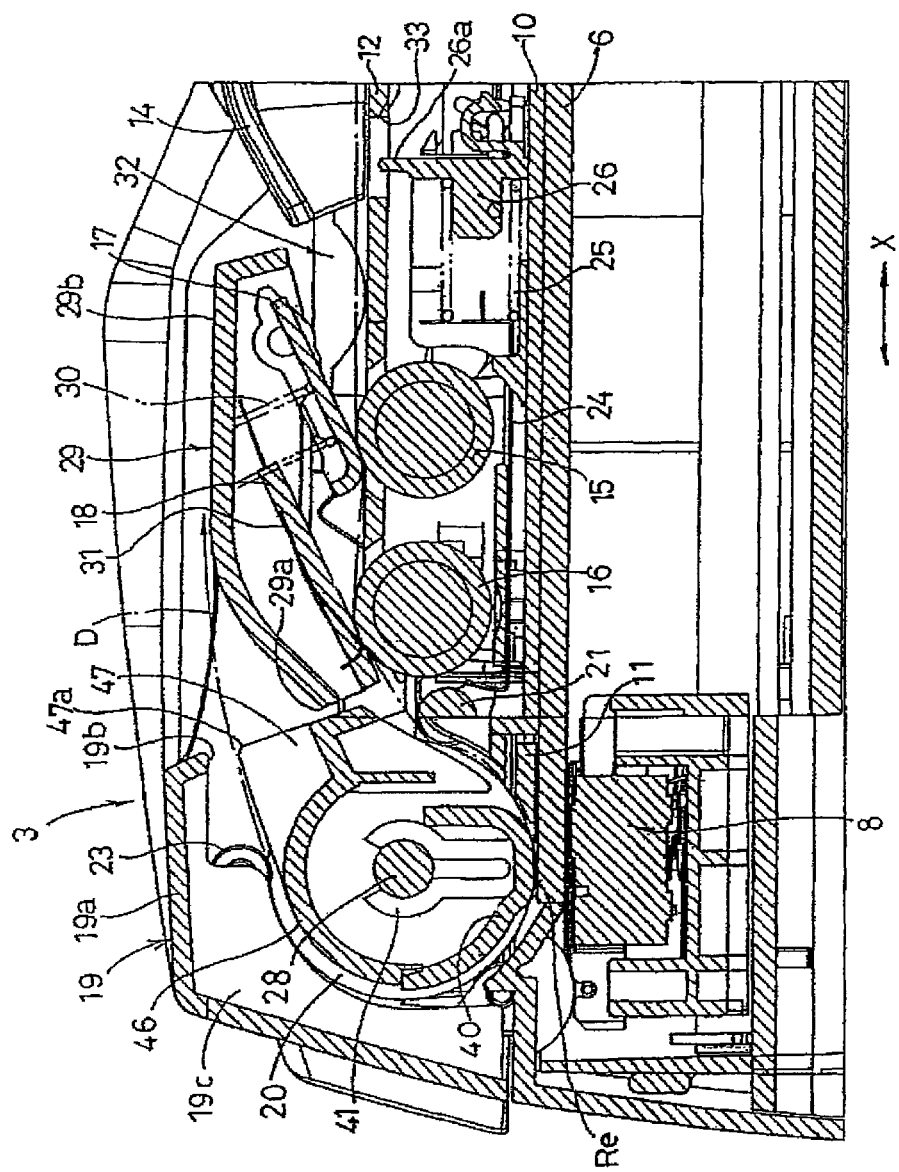
FIG. 7 is an enlarged cross-sectional view of FIG. 6.
Figure 8:
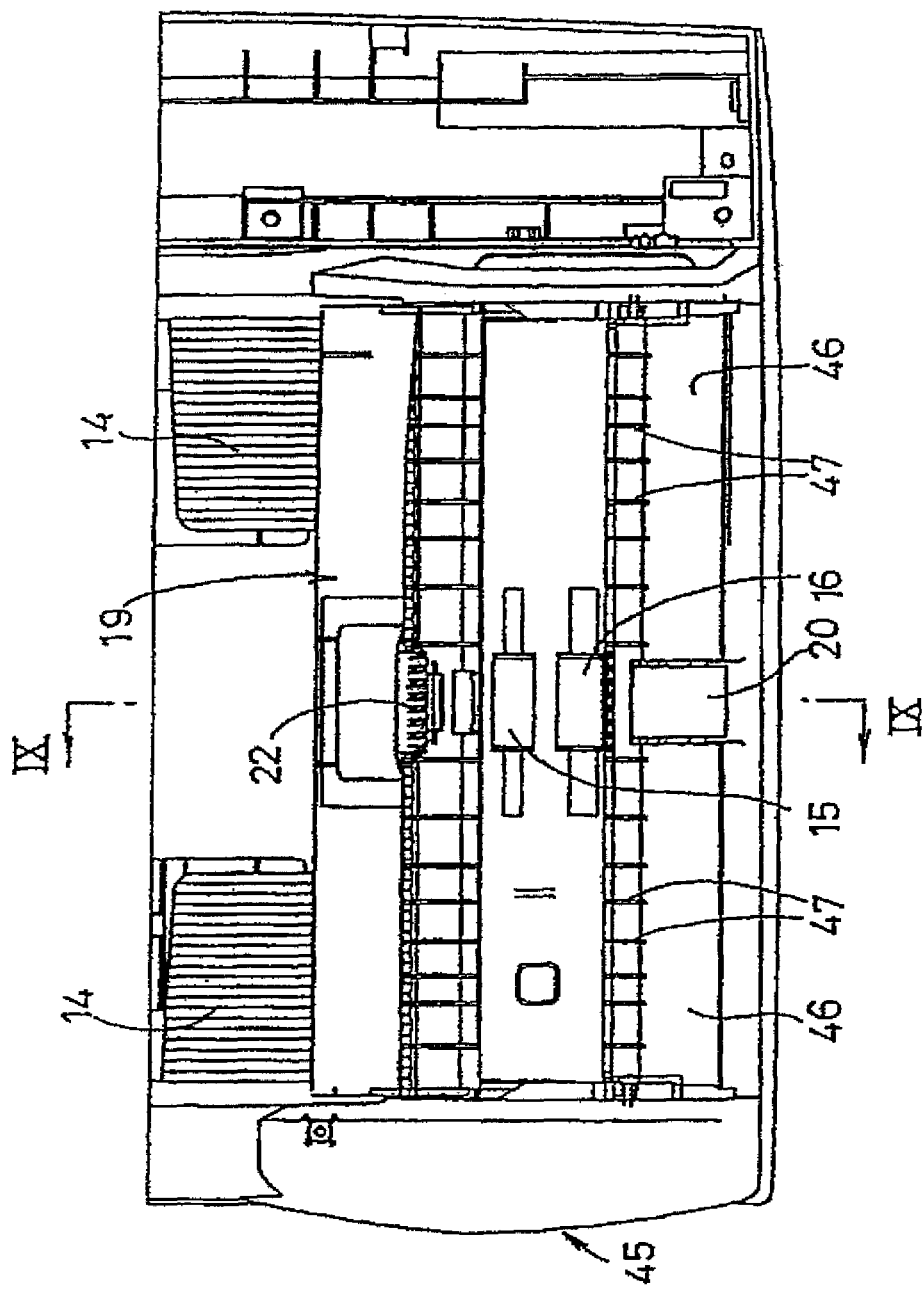
FIG. 8 is a plan view of the document feeder when the pathway cover is opened.

As shown in FIG. 7, the supporting plate 26 supporting the upstream end of the coil spring 25 is capable of moving in the X direction. In addition, a separating device is adopted. In the separating device, a handle 26a protruding from the supporting plate 26 is placed in a slit 33 provided in the upper cover 12. The operator can move the handle 26a and the supporting plate 26 with a finger or a tool, such as a screwdriver, to separate the first pinch roller 21 from the peripheral surface of the reverse roller 20 against the urging force of the coil spring 25. By doing so, the document D can be pulled therefrom with little force and the paper jam can be easily solved.

The document D to be read is placed between the lower surface of the plate-shaped discharging tray 14 and the feeding tray 13 with its image recording surface facing down. A distance between the lower surface of the horizontal portion of the discharging tray 14 and the upper surface of the feeding tray 13 is referred to as a height 112 (FIG. 6). An upstream end 14a of the discharging tray 14 disposed near the pulling roller 15 is tilted so as to be located at a position that is lower than the lower surface of the horizontal portion of the discharging tray 14. A distance between a tip of the upstream end 14a and the upper surface of the feeding tray 13 is referred to as a height 113 (FIG. 6). Therefore, a feeding inlet, defined by the upstream end 14a and the upper surface of the feeding tray 13, has the height H3. By setting H3<H2 (referring to FIG. 6), the document D stacked on the feeding tray 13 is smoothly guided between the pulling roller 15 and the pull-nipping plate 17. By employing the pulling device, for example, the pulling roller 15 and the pull-nipping plate 17, the document D stacked on the horizontal feeding tray 13 can be surely sent to the separating-transporting device, such as the separating roller 16 and the separating pad 18. In order to ensure this effect, the pulling roller 15 and the separating roller 16 have a substantially same diameter and a substantially same peripheral speed.

As shown in FIGS. 3, 7, 11 and 12, a first pressing member 40 is provided on each side of the reverse roller 20 (in the width direction of the document D) to press the image recording surface of the document D onto the surface of the glass plate 6 without any gap between the document D and the glass plate 6 at the opening 36 including the reading position Re. The first pressing members 40 are integrally formed (by injection molding of synthetic resin) with the large pressing plate 10 (i.e. the second pressing member). As shown in FIG. 12, base ends of the first pressing members 40 (the portions adjacent to side edges of the document D in its width direction) are integrally connected with portions adjacent to shaft supporting portions 42 for the driving shaft of the reverse roller 20 disposed at the side of the pressing plate 10. A transmission case 45, which houses therein a transmission gear mechanism 43 and a driving motor 44 for transferring the rotation driving force to the driving shaft 28, the pulling roller 15 and the separating roller 16, respectively, is externally disposed beside one of the shaft supporting portions 42 (referring to FIGS. 1-4, 10 and 12).

Each of the first pressing members 40 has a substantially semicircular-shaped body having a downwardly protruding portion, when viewed from the front. An elastic hook 41 is integrally formed with a portion, which is provided adjacent to the sides of the reverse roller 20, of each of the first pressing members 40. Each of the elastic hooks 41 is fitted to the driving shaft 28 of the reverse roller 20 such that the first pressing members 40 are suspended from the driving shaft 28. Accordingly, the position of the lower surfaces of the first pressing members 40 with respect to the glass plate 6 can be easily maintained with the simple structure.

The lower surface of each of the first pressing members 40 at a region corresponding to the opening 36 extends substantially in parallel with the surface of the glass plate 6, and is positioned closer to the surface of the glass plate 6 than the outer surface (the lower surface) of the reverse roller 20.

Accordingly, the document D that is being carried along the outer surface of the reverse roller 20 is temporarily separated from the lower surface of the reverse roller 20 such that the document D can be pressed onto the surface of the glass plate 6 without any gap therebetween, with the image recording surface facing downward. Thus, an image can be can be precisely read from the document D by the reading device 8. The first pressing members 40 are disposed beside the sides of the reverse roller 20 in the width direction of the document D perpendicular to the document conveying direction and the portions of the pressing members 40 that face the glass plate 6 have the substantially flat surface. Accordingly, a substantially uniformly flat surface can be provided across the entire image recording region in the width direction of the document D, without increasing the size of the reverse roller 20 in the width direction of the document D, by using the first pressing members 40 disposed on sides of the reverse roller 20. Thus, the image in the width direction of the document D can be precisely read.

Moreover, a white tape or paint is adhered or applied to the lower surface of each of the first pressing members 40 in the region including the reading position Re. In this way, the chromaticity or saturation as a reference in the reading device 8 can be detected.

A mechanism that enables the automatic document feeder 3 to stack discharged documents D in a normal order will be described. With the above mechanism, a subsequently discharged document D is surely placed under a previously discharged document D while their image recording surfaces face up, above the reverse roller 20, when the document D are discharged onto the discharge assistant guiding plate 29, and by extension, onto the discharging tray 14 after the documents D are read and reversed and further conveyed in the second transportation direction.

Figure 13:
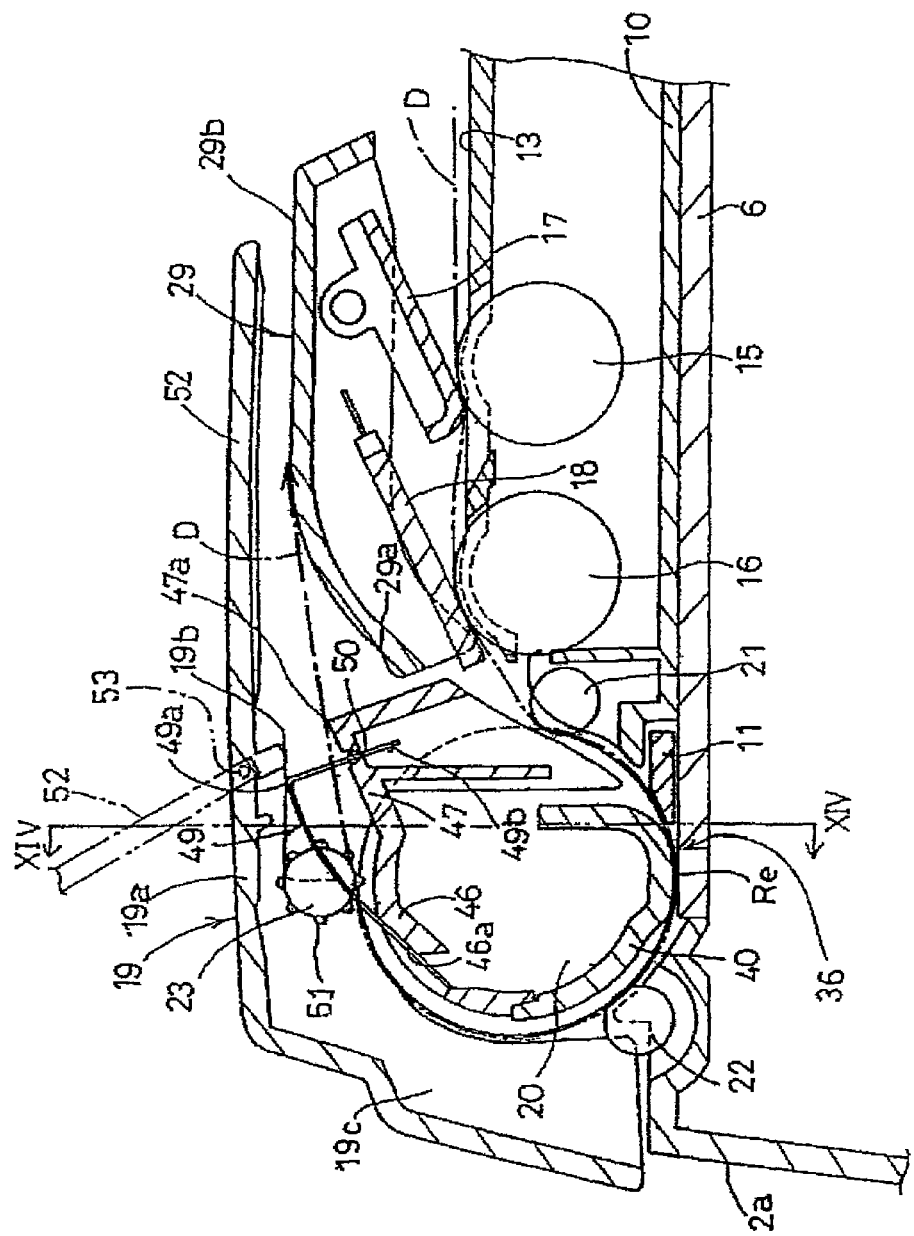
FIG. 13 is an enlarged cross-sectional view of second to fifth embodiments according to the present invention.
Figure 14:
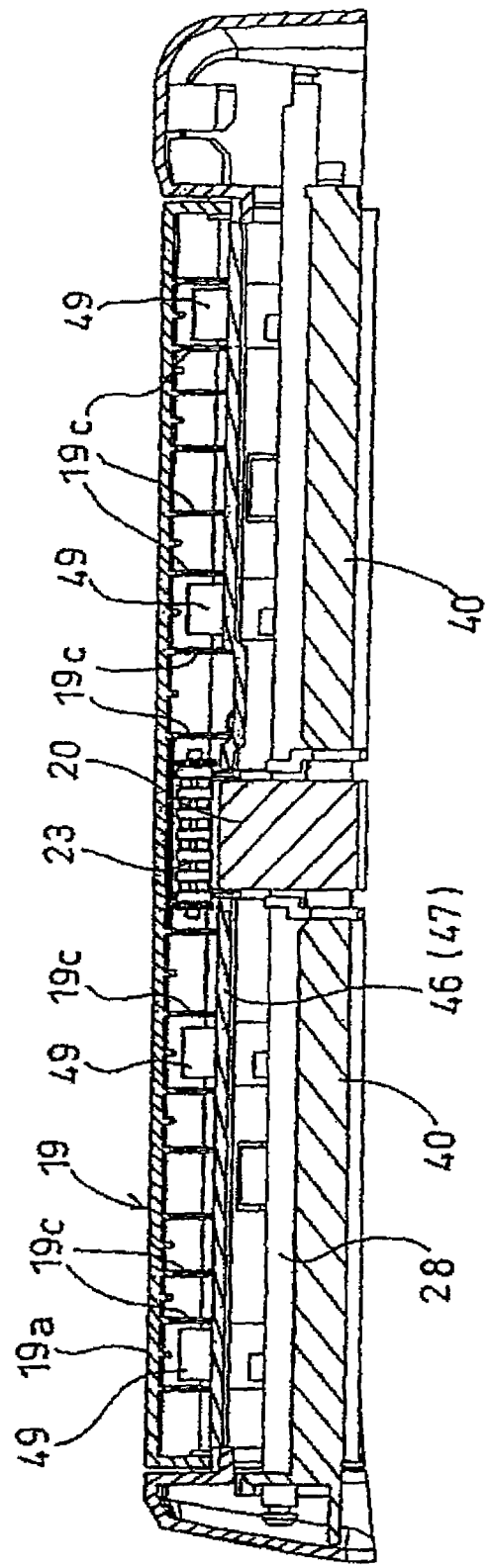
FIG. 14 is a cross-sectional view along line XIV-XIV of FIG. 13.

In the first embodiment, when the pathway cover 19 is closed, the nipping portion (the contact portion) of the most downstream third pinch roller 23 and the upper portion of the peripheral surface of the revere roller 20 is provided at a position that is higher than the upstream end 29a of the discharge assistant guiding plate 29 and that is lower than the upper surface of horizontal portion 29b of the discharge assistant guiding plate 29 (i.e. the downstream side), with respect to the document conveying direction (referring to FIGS. 6, 7 and 13).

With this structure, the documents D stacked on the discharging tray 13 with their image recording surfaces facing down, is separated, one by one, in order, and carried by the separating roller 16 and the separating pad 18, starting with the lowermost document D. The separated document D is carried to the opening 36 via the contact portion of the first pinch roller 21 and the lower peripheral surface of the reverse roller 20. At the opening 36, the document D is carried while being pressed by the first pressing members 40 so that the image recording surface of the document D is in contact with the surface of the glass plate 6. The image of the document D is read at the reading position Re in the opening 36 by the reading device 8 located under the opening 36. The document D is then conveyed through the contact portions of the second and third pitch rollers 22, 23 and the peripheral surfaces of the reverse roller 20 and is discharged from the discharging outlet that is provided under a downstream end 19b of the upper roof 19a of the pathway cover 19 with respect to the document conveying direction. The discharged document D is placed on the upper surfaces of the discharge assistant guiding plate 29 and the discharging tray 14, with its image recording surface facing up. In such a case, the position where the third pinch roller 23 and the reverse roller 20 are contacted with each other at a position is higher than the upstream end 29a of the discharge assistant guiding plate 29 and is lower than the upper surface of the horizontal portion 29b of the discharge assistant guiding plate 29 (i.e. the downstream portion) with respect to the document conveying direction. Thus, the front end of the subsequently discharged document D approaches the lower surface i.e. the surface opposite to the image recording surface of the previously discharged document D that is placed on the discharge assistant guiding plate 29, and the subsequently discharged document D is guided onto the discharge assistant guiding plate 29. Therefore, the stacking order of the discharged documents is the same as that of the documents D that were placed on the feeding tray 13 before being read. Consequently, the operator does not have to change the stacking order of the discharged documents D.

A second embodiment for ensuring the above effect is shown in FIGS. 3, 4, 6, 7 and 13. A pair of engaging members 46 having a substantially semicylindrical shape in cross-section is disposed on the sides of the reverse roller 20 while sandwiching the reverse roller 20 therebetween, so as to extend in the width direction of the document D. Each of the engaging members 46 is disposed above each of the respective first pressing members 40 and continues to the upper part of each of the respective first pressing members 40. The pair of engaging members 46 covers the driving shaft 28 from the upper side. Each of the respective engaging members 46 is connected with each of the respective first pressing members 40 by an engaging device (not shown). A plurality of rib-shaped guiding members 47 is integrally formed on outer surfaces of the engaging members 46, at predetermined intervals, along the extension direction of the driving shaft 28. The guiding members 47 extend diagonally upward from the outer surfaces of the engaging members 46 at positions that is the same level when the third pinch roller 23 and the reverse roller 20 contact with each other. The guiding members 47 extends to the vicinity of the upstream end 29a of the discharge assistant guiding plate 29. A top end 47a of each of the guiding members 47 is located at a position that is higher than the position where the third pinch roller 23 and the reverse roller 20 are contacted with each other. With this structure, the document D that is released from the contact portion of the third pinch roller 23 and the reverse roller 20 is guided to the position above the top ends 47a along the guiding members 47. Since the top ends 47a of the guiding members 47 are provided at the positions lower than the horizontal portion 29b of the discharge assistant guiding plate 29, the front end of the subsequently discharged document D approaches the lower surface (i.e. the surface opposite to the image recording surface) of the previously discharged document D placed on the discharge assistant guiding plate 29, and the subsequently discharged document can be guided onto the discharge assistant guiding plate 29. Thus, the stacking order of the discharged documents D can become the same as that of the documents D that were placed on the feeding tray 13 before being read.

A third embodiment for maintaining the stacking order of the discharged documents D in the normal order is shown in FIG. 13. The automatic document feeder 3 of the third embodiment includes elastic supporting members 49 for lifting the document D from the contact portion of the third pinch roller 23, which is located at the most downstream position in the document conveying direction, and the reverse roller 20. Each elastic supporting member 49 includes an elastic plate made of synthetic resin, such as PET (polyethylene terephthalate) with a thickness of 0.2 mm to 1 mm, and the cross section thereof is substantially L-shape. A base end of each of the elastic supporting plates 49 is fixed by adhesive in each of respective recesses 46a that are disposed at appropriate positions on the outer surfaces of the engaging members 46 in the width direction of the document D, near the contact portion of the third pinch roller 23 and the reverse roller 20. Each of the elastic supporting members 49 is arranged such that the elastic supporting plate 49 is lifted toward the downstream in the document conveying direction (i.e. an top end 49a of each of the elastic supporting member 49 is located at a position higher than the horizontal portion 29b of the discharge assistant guiding plate 29). A free end 49b of each of the elastic supporting members 49 bends and extends downward from the top end 49a, and is inserted into each of respective slits 50 provided in the engaging members 46. In this way, when the document D that is released from the contact portion of the third pinch roller 23 and the reverse roller 20 is placed onto the elastic supporting members 49, the elastic supporting members 49 are warped downward due to the weight of the document D. In this condition, while the free end (the front end) of the document D that is upwardly supported by the elastic force of the elastic supporting members 49 is maintained in a substantially horizontal position, the document D can then be discharged onto the discharge assistant guiding plate 29. The front end of the subsequently discharged document D approaches the lower surface (i.e. the surface opposite to the image recording surface) of the previously discharged document D that is placed on the horizontal portion 29b of the discharge assistant guiding plate 29, and the subsequently discharged document D can be guided and conveyed onto the discharge assistant guiding plate 29. Thus, the stacking order of the discharged documents D can be the same as that of the documents D that were placed on the feeding tray 13 before being read.

Each of the elastic supporting members 49 has a substantially L shape in cross section. The base ends of the elastic supporting members 49 are fixed on the respective outer surface of the engaging members 46 disposed on the both sides of the reverse roller 20. The free ends 49b of the elastic supporting members 49 that extend diagonally downward are inserted into the respective slits 50 provided in the engaging members 46. When the document D is conveyed onto the elastic supporting members 49 and the elastic supporting members 49 are warped downward due to its elasticity, the free ends 49b thereof move up and down while being guided along the respective slits 50. Thus, the warping direction of the elastic supporting members 49 is limited, so that the front end of the subsequently discharged document D is further ensured to approach the lower surface (i.e. the surface opposite to the image recording surface) of the previously discharged document D.

A plurality of ribs 19c that extend in the X direction to the downstream end 19b with respect to the document conveying direction are integrally formed on the inner surface of the pathway cover 19 (referring to FIGS. 3, 4, 7, 9, 10, 13 and 14). The ribs 19c are arranged in the Y direction at predetermined intervals. The elastic supporting members 49 are arranged between the plurality of the ribs (referring to FIG. 14). By doing so, the range of moving up and down of the top end 49a can be widen. Thus, the lifting of the discharged document D by the elastic supporting members 49 can be further maintained.

A fourth embodiment for maintaining the stacking order of the discharged documents D in the normal order is shown in FIG. 13. A plurality of sweeping rollers 51 is disposed at a substantially same height as the third pinch roller 23 located at the most downstream position in the document conveying direction. The sweeping rollers 51 can be a cylindrical roller with protrusions individually arranged on the periphery thereof at predetermined intervals, can be a roller having a spur-like cross section, or can be a spur made of a thin plate. The plurality of sweeping rollers 51 is arranged facing the outer surfaces of the engaging members 46 or the reverse roller 20. When the sweeping rollers 51 are disposed facing the outer surfaces of the engaging members 46, the sweeping rollers 51 are preferably willingly rotated. According to the structure of this embodiment, because of the rotation of the sweeping rollers 51, the front end of the document D that is released from the contact portion of the third pinch roller 23 and the reverse roller 20 is willingly lifted. If the front end of the document D curls downward, the front end of the document D is prevented from being interfered with the tilted upstream end 29a of the discharge assistant guiding plate 29. Therefore, the document D can be smoothly guided toward the horizontal portion 29b of the discharge assistant guiding plate 29. Thus, the stacking order of the discharged documents D is the same as that of the documents D that were placed on the feeding tray 13 before being read.

A fifth embodiment for maintaining the stacking order of the discharged documents D in the normal order will be described. The automatic document feeder 3 includes a substantially horizontal cover-like upper guiding member 52, which is provided so as to cover at least a portion of the upper side of the discharge assistant guiding plate 29. The cover-like upper guiding member 52 preferably extends from the tilted upstream end 29a to the upstream half of the horizontal portion 29b of the discharge assistant guiding plate 29 as shown in FIGS. 1 and 13. With this structure, the upstream part of the previously discharged document D placed on the discharge assistant guiding plate 29 in the document conveying direction is regulated by a lower surface of the cover-like upper guide member 52, so that the upstream part of the document D can be maintained to be substantially parallel to the horizontal portion 29b of the discharge assistant guiding plate 29. Thus, the front end of the subsequently discharged document is smoothly guided toward the lower surface (i.e. the surface opposite to the image recording surface) of the previously discharged document D. Consequently, a plurality of discharged documents can be stacked on the discharging tray 14 in the order that is the same as that of the documents D that were placed on the feeding tray 13 before being read.

A base end of the cover-like upper guiding member 52 is attached, via a hinge 53, at a position near the downstream end 19b of the upper roof 19a of the pathway cover 19 and is pivotable upward and downward about the hinge 53. Accordingly, when the pathway cover 19 is widely opened, a free end of the cover-like upper guide member 52 contacts the upper surface of the discharging tray 14 or the feeding tray 13. Thus, the opening state of the pathway cover 19 can be maintained.

Moreover, the present invention may preferably be adopted by appropriately incorporating the features and structures described in the second to fifth embodiments into the features and structures of the first embodiment.

Furthermore, the outer surfaces of the engaging members 46 have a substantially semicircular shape. Thus, the curled end portions (the sides in the width direction of the document D) which are not slide-contacted with the reverse roller 20 can be guided to the discharging outlet smoothly along the outer surfaces of the engaging members 46 without being caught by the driving shaft 28.

The reverse roller 20 functioning as the second rotation driving member can be replaced by using an endless belt.

While the invention has been described in detail with reference to the specific embodiments thereof, it would be apparent to those skilled in the art that various changes, arrangements and modifications may be applied therein without departing from the spirit and scope of the invention.

What is claimed is:

1. A document feeder provided on an image reader having a reading device that reads an image of a document of a plurality of documents at a reading position, the document being conveyed in a predetermined conveying direction, the document feeder comprising:
   a document transporting pathway through which the document can pass from a feeding tray to a discharging tray;
   an input device that feeds the documents, one by one, into the document transporting pathway,
   a discharge device that discharges the documents from the document transporting pathway,
   a pair of rollers that includes a transporting roller and a following roller;
   a movable frame that is disposed on a body side of the document feeder; wherein
   the following roller is arranged upstream from the reading position with respect to the predetermined conveying direction, and the following roller is provided to the movable frame that is urged by a spring member such that the following roller is pressed against the transporting roller,
   the document transporting pathway is substantially U-shaped and includes:
      a first path, in which the document is conveyed in a first transportation direction; and
      a second path, in which the document is conveyed in a second transportation direction that is substantially opposite of the first transportation direction,
   the transporting roller is a reverse roller that transports the document from the first path to the second path, and
   the following roller is disposed between the reverse roller and the input device.

2. The document feeder according to claim 1, further comprising a separating device that separates the following roller from the reverse roller.

3. The document feeder according to claim 1, further comprising a separating means that separates the following roller from the reverse roller.

4. A document feeder provided on an image reader having a reading device that reads an image of a document of a plurality of documents at a reading position, the document being conveyed in a predetermined conveying direction, the document feeder comprising:
   a document transporting pathway through which the document can pass from a feeding tray to a discharging tray;
   an input device that feeds the documents, one by one, into the document transporting pathway,
   a discharge device that discharges the documents from the document transporting pathway,
   a pair of rollers that includes a transporting roller and a following roller;
   a movable frame that is disposed on a body side of the document feeder;
   wherein:
   the following roller is arranged upstream from the reading position with respect to the predetermined conveying direction, and the following roller is provided to the movable frame that is urged by a spring member such that the following roller is pressed against the transporting roller,
   the document transporting pathway is substantially U-shaped and includes:
      a first path, in which the document is conveyed in a first transportation direction; and
      a second path, in which the document is conveyed in a second transportation direction that is substantially opposite to the first transportation direction,
   the transporting roller is a reverse roller that transports the document from the first path to the second path, and
   the input device includes a separating-transporting device that separates one of the plurality of the documents and conveys the separated document to the reverse roller and the spring member is disposed at a position such that the separating-transporting device is between the following roller and the spring member.

5. The document feeder according to claim 4, wherein the movable frame is disposed under the separating-transporting device.

6. The document feeder according to claim 4, wherein the following roller, the separating-transporting device and the spring member are substantially arranged in a horizontal direction.

7. A document feeder provided on an image reader having a reading device that reads an image of a document of a plurality of documents at a reading position, the document being conveyed in a predetermined conveying direction, the document feeder comprising:
   a document transporting pathway through which the document can pass from a feeding tray to a discharging tray;
   an input device that feeds the documents, one by one, into the document transporting pathway,
   a discharge device that discharges the documents from the document transporting pathway,
   a pair of rollers that includes a transporting roller and a following roller;
   a movable frame that is disposed on a body side of the document feeder;
   wherein:
   the following roller is arranged upstream from the reading position with respect to the predetermined conveying direction, and the following roller is provided to the movable frame that is urged by a spring member such that the following roller is pressed against the transporting roller,
   the document transporting pathway is substantially U-shaped and includes:
      a first path, in which the document is conveyed in a first transportation direction; and
      a second path, in which the document is conveyed in a second transportation direction that is substantially opposite to the first transportation direction,
   the transporting roller is a reverse roller that transports the document from the first path to the second path, and
   the spring member is disposed at a position such that the input device is between the following roller and the spring member.

8. The document feeder according to claim 7, wherein the movable frame is disposed under the input device.

* * * * *